United States Patent
Schleicher et al.

(10) Patent No.: US 8,626,406 B2
(45) Date of Patent: Jan. 7, 2014

(54) METHOD AND SYSTEM FOR TRANSFERRING MATERIAL BETWEEN VEHICLES

(75) Inventors: Tyler D Schleicher, Ankeny, IA (US); Dale O Pellatz, Grimes, IA (US); Frederick W Nelson, Waukee, IA (US); Matthew D Potter, Dallas Center, IA (US); Monte E Miller, Winterset, IA (US); Brandon G Leiran, Grimes, IA (US)

(73) Assignee: Deere & Company, Moline, IL (US)

( * ) Notice: Subject to any disclaimer, the term of this patent is extended or adjusted under 35 U.S.C. 154(b) by 56 days.

(21) Appl. No.: 13/419,581

(22) Filed: Mar. 14, 2012

(65) Prior Publication Data

US 2013/0166157 A1    Jun. 27, 2013

Related U.S. Application Data

(60) Provisional application No. 61/579,132, filed on Dec. 22, 2011.

(51) Int. Cl.
   *G06F 7/70*    (2006.01)

(52) U.S. Cl.
   USPC .............................................. 701/50; 701/24

(58) Field of Classification Search
   USPC .................................................... 701/50, 24
   See application file for complete search history.

(56) References Cited

U.S. PATENT DOCUMENTS

| | | |
|---|---|---|
| 5,646,844 A | 7/1997 | Gudat et al. |
| 5,712,782 A | 1/1998 | Weigelt et al. |
| 5,749,783 A | 5/1998 | Pollklas |
| 6,216,071 B1 | 4/2001 | Motz |
| 6,682,416 B2 | 1/2004 | Behnke et al. |
| 6,687,616 B1 | 2/2004 | Peterson et al. |
| 6,732,024 B2 | 5/2004 | Wilhelm Rekow et al. |

(Continued)

FOREIGN PATENT DOCUMENTS

| | | |
|---|---|---|
| EP | 2138027 A1 | 12/2009 |
| EP | 2301318 B1 | 11/2011 |

(Continued)

OTHER PUBLICATIONS

Borthwick, James Robert, Mining Haul Truck Pose Estimation and Load Profiling Using Stereo Vision. Aug. 2009. The University of British Columbia (Vancouver).

(Continued)

*Primary Examiner* — Thomas Black
*Assistant Examiner* — Luke Huynh

(57) ABSTRACT

A user interface alerts an operator of the lead vehicle if the follower vehicle location is within a predefined radius of the lead vehicle location and a predetermined angular difference with respect to a heading of the lead vehicle. A user interface response mechanism is configured such that the operator can accept or reject jointly coordinated movement of the lead vehicle and follower vehicle for unloading the lead vehicle during an unloading period. The first wireless communications device is adapted to transmit an alignment data message to the follower vehicle to maintain a target offset between the lead vehicle and the follower vehicle, where the target offset is based on a first vehicle identifier of the follower vehicle, a second vehicle identifier of the lead vehicle, and preset target offset stored in at data storage device associated with the lead vehicle.

24 Claims, 6 Drawing Sheets

(56) References Cited

U.S. PATENT DOCUMENTS

| | | |
|---|---|---|
| 6,943,824 B2 | 9/2005 | Alexia et al. |
| 7,277,784 B2 | 10/2007 | Weiss |
| 8,060,283 B2 | 11/2011 | Mott et al. |
| 2009/0044505 A1 | 2/2009 | Huster et al. |
| 2010/0063692 A1 | 3/2010 | Madsen et al. |
| 2010/0108188 A1 | 5/2010 | Correns et al. |
| 2010/0332051 A1 | 12/2010 | Kormann |
| 2011/0061762 A1 | 3/2011 | Madsen et al. |
| 2011/0205084 A1 | 8/2011 | Morselli et al. |
| 2012/0215394 A1* | 8/2012 | Wang et al. ............... 701/24 |

FOREIGN PATENT DOCUMENTS

| | | |
|---|---|---|
| EP | 2311307 B1 | 12/2011 |
| EP | 2020174 B1 | 2/2012 |
| JP | 2177815 A | 7/1990 |

OTHER PUBLICATIONS

Singh, Sanjiv; and Digney. Bruce; Autonomous Cross-Country Navigation Using Stereo Vision. Jan. 1999. Carnegie Mellon University, Pittsburgh, PA.

AgCam Photo Album [online], 2009 [retrieved on Oct. 3, 2012], Retrieved from the Internet: <URL: http://dakotamicro.com/docs/AgCam Photo Album.pdf>.

Claas, Agritechnica 2009; Two Golds and a Silver for CLAAS [online], 2009 [retrieved on Oct. 3, 2012], Retrieved from the Internet: <URL: http://www.claas.com/cl-gr/en/press/mitteilungen/2009/start%20cid=565120.bpSite=35108.lang=en_UK.html>.

* cited by examiner

METHOD AND SYSTEM FOR TRANSFERRING MATERIAL BETWEEN VEHICLES

RELATED APPLICATION

This application claims the benefit of the filing date of and priority to U.S. Provisional Application Ser. No. 61/579,132, filed Dec. 22, 2011, which is incorporated herein by reference in its entirety.

FIELD OF THE INVENTION

This invention relates to a method and system for transferring material between vehicles.

BACKGROUND

Certain prior art systems may use global positioning system (GPS) receivers to maintain proper spacing between two vehicles during the unloading or transferring of material (e.g., an agricultural material) between the vehicles (e.g., moving vehicles). However, such prior art systems may lack a reliable, user friendly mechanism for coordinating the unloading activities between pairs of vehicles in the fleet. Thus, there is a need for an improved system for managing the unloading of agricultural material from a vehicle to account for pragmatic coordination of the unloading activities between pairs of vehicles in the fleet.

SUMMARY OF THE INVENTION

In accordance with one embodiment, the method or system comprises a first location-determining receiver for determining a lead vehicle location of a lead vehicle. A first wireless communications device receives a follower vehicle location of a follower vehicle. A user interface is adapted for alerting an operator of the lead vehicle if the follower vehicle location is within a proximity zone of the lead vehicle (or within a predefined radius of the lead vehicle location and a predetermined angular difference with respect to a heading of the lead vehicle). The user interface provides an operator of the lead vehicle with a user interface response mechanism in response to a received data message request from the follower vehicle within the predefined radius and predetermined angular distance such that the operator can accept or reject jointly coordinated movement (e.g., pairing) of the lead vehicle and follower vehicle for unloading the lead vehicle during an unloading period. The first wireless communications device is adapted to transmit an alignment data message to the follower vehicle to maintain a target offset between the lead vehicle and the follower vehicle if the operator accepts the jointly coordinated movement. The target offset is based on a first vehicle identifier of the follower vehicle, a second vehicle identifier of the lead vehicle, and preset target offset stored in at data storage device associated with the lead vehicle.

DESCRIPTION OF THE PREFERRED EMBODIMENT

Figure 1:
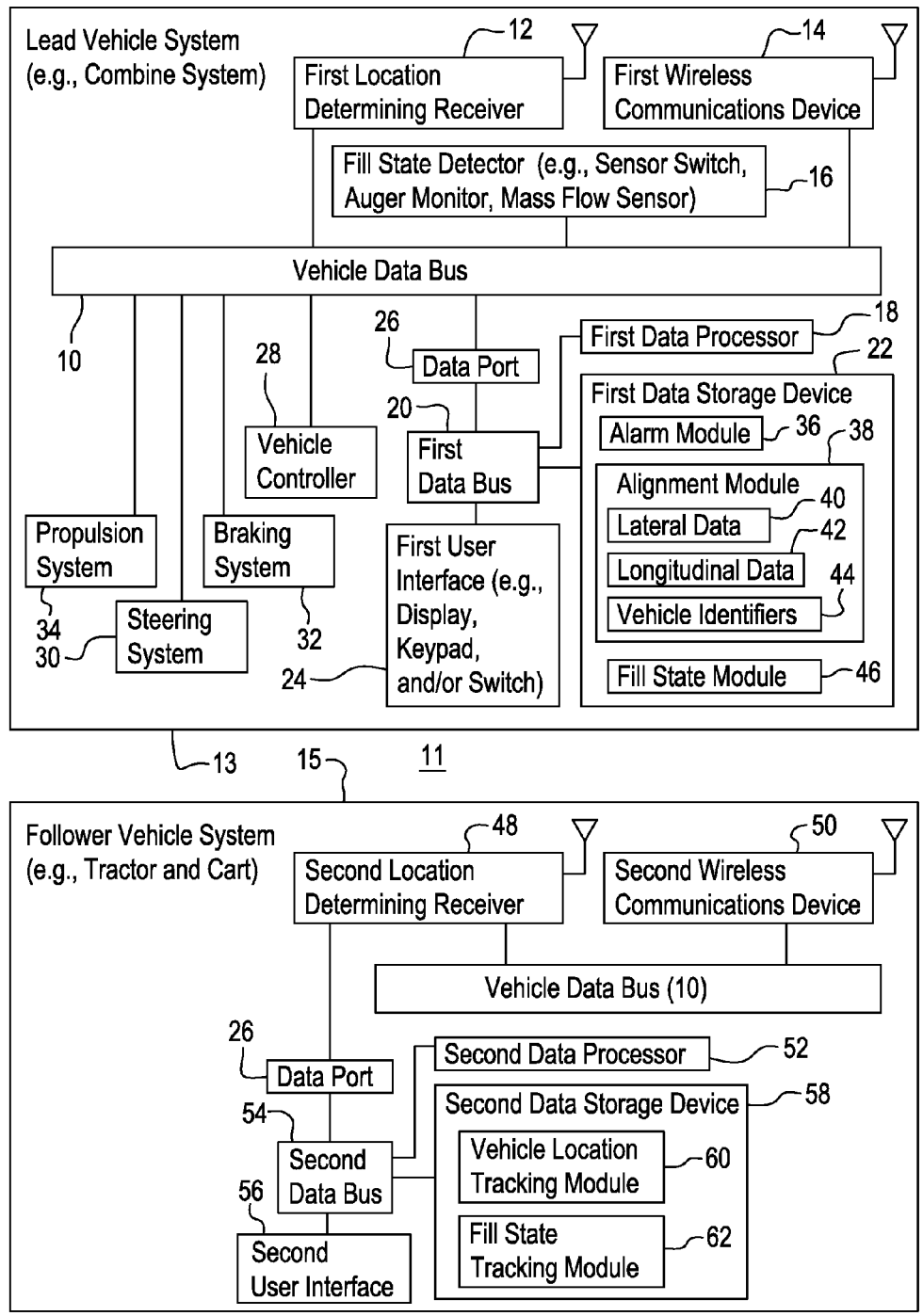
FIG. 1 is a block diagram of one embodiment of a system for transferring material (e.g., agricultural material) between two vehicles.

In accordance with one embodiment, FIG. 1 shows a system 11 for transferring or unloading material (e.g., agricultural material) between two vehicles (e.g., moving vehicles). The vehicles may comprise a lead vehicle (e.g., combine or harvesting machine) and follower vehicle (e.g., a combine and grain cart) that are both moving. An agricultural material may comprise grain, corn, soybeans, legumes, nuts, vegetables, fruits, potatoes, tubers, oilseeds, fiber or other harvested plant material. Materials may comprise agricultural materials, minerals, metals, oil, tar sands, shale, raw petroleum products, mined materials, ores, soil, sand, clay, stones, crushed rock, gravel, peat, organic matter, animal waste or other materials.

As illustrated in FIG. 1, the system 11 comprises a lead vehicle system 13 and a follower vehicle system 15. The lead vehicle system 13 and the follower vehicle system 15 can communicate with each other via wireless communication devices (14, 50). Although one lead vehicle system 13 and one follower vehicle system 15 are illustrated in FIG. 1, in practice multiple lead vehicle systems may be used in conjunction with multiple follower vehicle systems in the same work area (e.g., field).

The lead vehicle system 13 comprises a first data processor 18, a first data storage device 22, and a first user interface 24 coupled to a first data bus 20. In turn, the first data bus 20 is coupled to the vehicle data bus 10 via a data port 26.

A first location-determining receiver 12, a first wireless communications device 14, a fill state detector 16, a propulsion system 34, a steering system 30, a braking system 32, and a vehicle controller 28 are coupled to the vehicle data bus 10. Any of the following devices or network elements may communicate with each other via the vehicle data bus 10: the first location-determining receiver 12, the first wireless communications device 14, the fill state detector 16, the propulsion system 34, the steering system 30, the braking system 32, and the vehicle controller 28, the data port 26, the first data processor 18, the first data storage device 22 and the first user interface 24.

The first data storage device 22 comprises an alarm module 36, an alignment module 38 and a fill state module 46. In one embodiment, the alignment module 38 further comprises lateral data, longitudinal data, and vehicle identifiers 44. An alignment module 38 may comprise software instructions, a software module, or an electronic module that allows an operator of the lead vehicle to do one or more of following via the first user interface 24: (1) set, preset, or record a target offset between the lead vehicle and follower vehicle for unloading of material; (2) recall, retrieve or activate the set, preset or recorded target offset in preparation for unloading of material; and (3) maintain the target offset by facilitating communications between the follower vehicle and lead vehicle; and (4) deactivate the set, preset, or recorded target offset after loading is complete.

The fill state detector 16 may comprise one or more of the following: a weight sensor (e.g., piezo-electric sensor or network of piezo-resistive sensors) for sensing the weight or mass of material (e.g., agricultural material) within a container associated with the lead vehicle; a mass flow sensor for sensing the mass or volume of agricultural material harvested by the lead vehicle (e.g., combine); an auger monitor for monitoring the duration of operation of an unloading auger associated with agricultural material in a container associated with the lead vehicle; and one or more optically activated or mechanically activated switches mounted in or around the container for holding the agricultural material to detect various discrete levels (e.g., one-quarter full, one-half full, three-quarters full, or completely full) of the agricultural material in the container. Further, each fill state detector 16 may comprise one or more sensors that provide digital logic levels or analog logic levels that are converted by analog-to-digital converters and processed by a data processor or logic circuitry. If switches are used to detect discrete levels (e.g., one-half full) of the agricultural material, switch states of the switches provide digital logic levels to logic circuitry or a data processor to estimate the level of agricultural material in the container of the lead vehicle.

As illustrated in FIG. 1, the follower vehicle system 15 comprises a second data processor 52, a second data storage device 58, and a second user interface 56 coupled to a second data bus 54. In turn, the second data bus 54 is coupled to the vehicle data bus 10 (of the follower vehicle system 15) via a data port 26. The second location-determining receiver 48 and the second wireless communications device 50 are coupled to the vehicle data bus 10.

In one embodiment, the second data storage device 58 comprises a vehicle location tracking module 60 and a fill state tracking module 62. The location tracking module 60 allows the second data processor 52 to track all current locations of the lead vehicle or lead vehicles with systems 13 in a work area or region. The second wireless communications device 50 can poll, interrogate, or receive lead vehicle location data from each lead vehicle system 13 (e.g., within radio frequency range) that transmits location data and a corresponding vehicle identifier. The fill state tracking module 62 allows the second data processor 52 to track the current fill statuses of the lead vehicles with systems 13 in a work area or region. The second wireless communications device 50 can poll, interrogate, or receive lead vehicle fill status data from each lead vehicle system 13 (e.g., within radio frequency range) that transmits fill status data and a corresponding vehicle identifier. The location tracking module 60 and the fill state tracking module 62 facilitate display of locations of lead vehicles and corresponding fill status on the second user interface 56.

The first data processor 18 and the second data processor 52 each comprise a microprocessor, a microcontroller, an application specific integrated circuit, a digital signal processor, a programmable logic array, a logic device, an arithmetic logic unit, or another optical or electronic device for processing, inputting or outputting data.

The first data storage device 22 and the second data storage device 58 each comprise one or more of the following: electronic memory, non-volatile random access memory, electronically programmable erasable memory, an optical storage device, a magnetic storage device, an optical disc drive, a magnetic disc drive, or another device for storing or retrieving digital or analog data.

The first user interface 24 and the second user interface 56 each comprise a keypad, a keyboard, a pointing device (e.g., electronic mouse), a display, or another device for entering, inputting or displaying data.

The vehicle controller 28 may comprise a data processor that is capable of generating command data that includes one or more of the following: steering command data, braking command data, propulsion command data, speed data, acceleration data, vehicle heading angle, deceleration data, and tracking error data. In one embodiment, the vehicle controller 28 may comprise path planner, an obstacle detector, and an obstacle avoidance system, a dead reckoning navigation system, or another navigation system. The vehicle controller 28 is capable of communicating command data to the propulsion system 34, the steering system 30, and the braking system 32.

The propulsion system 34 may comprise an internal combustion engine that is controlled by a fuel injection system, a throttle system, or another fuel metering device that can be controlled via an electrical or electronic signal. The steering system 30 may comprise an electro-hydraulic steering system, a solenoid-controlled mechanical steering system, an electric motor-controlled rack-and-pinion steering system, or an electric motor-controlled steering system. The braking system 32 may comprise an electro-hydraulic braking system, a solenoid-controlled mechanical braking system, a regenerative electromagnetic braking system, or the like.

The lead vehicle is associated with a vehicle identifier 44 (e.g., first vehicle identifier) that is unique and facilitates distinguishing of the lead vehicle from other vehicles (e.g., lead vehicle or follower vehicle). Similarly, the follower vehicle is associated with a vehicle identifier 44 (e.g., second vehicle identifier) that is unique and facilitates distinguishing the follower vehicle from other vehicles. In one configuration, the vehicle identifier 44 is stored in the first data storage device 22 of the lead vehicle system 13. In one embodiment, the vehicle identifiers 44 stored in the first data storage device 22 remain stored in the data storage device (e.g., nonvolatile electronic memory) even when the lead vehicle system 13 or lead vehicle is turned off or powered down.

The first data storage device 22 may store lateral data 40, longitudinal data, target offset data, heading data, and vehicle identifiers 44. In one embodiment, the target offset data may comprise a lateral data 40 and longitudinal data 42. In another embodiment, the target offset data may be expressed as a vector with lateral and longitudinal vector components or in polar coordinates. The target offset may be established by a calibration process, while the lead vehicle and the follower vehicle are operating in a target alignment (with suitable generally constant spatial separation for unloading material) when the operator of the lead vehicle records such target alignment by activating a switch of the first user interface 24 or otherwise.

The first data processor 18 manages, supervises or controls enabling, activating or deactivating the automatic tracking or control of the follower vehicle with a target offset with respect to the lead vehicle, or mutually aligned position of a pair of the lead vehicle and the follower vehicle.

The system 11 of FIG. 1 supports ad hoc formation of pairs of lead vehicle and follower vehicles for a sufficient time period to allow for unloading of material (e.g., agricultural material) from the lead vehicle. In any pair of vehicles, the lead and follower vehicle are coupled virtually by operating with the target offset, spatially separated from one another by a generally constant spatial separation during a transitory unloading period. The vehicles are not actually physically coupled together during the unloading period. Once the lead vehicle is unloaded, the pair of the lead vehicle and follower vehicle is separated or disbanded until the container in the lead vehicle is full of material (e.g., harvested grain). However, the lead vehicle is free to couple or create a new pair with a different follower vehicle than the first follower vehicle that was previously coupled with the lead vehicle for unloading. In this way, the lead vehicle can be unloaded without delay by forming a pair (of a lead vehicle and a follower vehicle) with any available follower vehicle (in a fleet) that is not unloading another lead vehicle, transporting agricultural material, or busy with another task.

A second user interface 56 of the follower vehicle may display a plan view or an overhead field view of vehicle locations or relative locations of the active vehicles of a fleet in the field, along with respective bin fill status of a container associated with the lead vehicle. Further, if multiple lead vehicles are present, the second user interface 56 may display vehicle locations and respective bin fill statuses for corresponding lead vehicles. The second user interface 56 of the follower vehicle may alert the operator of the follower vehicle with respect to any lead vehicles that are equal to or greater than a threshold level of fullness (e.g., approximately seventy five percent) or if the operator of the lead vehicle has requested unloading of the lead vehicle. In response to observing a lead vehicle with fill status greater than a threshold level or an unloading request, the operator controls a follower vehicle to approach the lead vehicle or the approaching follower vehicle claims or reserves the unloading of the lead vehicle by generating and transmitting a data message (e.g., a reservation data message) to the fleet of follower vehicles.

Each pair of the lead vehicle and follower vehicle may be associated with a particular target offset. The target offset may include a lateral offset component between the lead vehicle and the follower vehicle and a longitudinal offset between the lead vehicle and the follower vehicle. Longitudinal offset refers to the fore/aft relative position of the lead vehicle and the follower vehicle. The target offset, the lateral offset and the longitudinal offset may be established by one or more of the following: the dimensions of the lead vehicle, the dimensions of the follower vehicle, the wheelbase of the lead vehicle, the wheelbase of the follower vehicle, the turning radius of the lead vehicle, the turning radius of the follower vehicle, and the loaded weight of the lead vehicle, and the loaded weight of the follower vehicle. The first data storage device 22 may store respective lateral data 40 and the longitudinal data 42 for a corresponding vehicle identifier or pair of vehicle identifiers for a particular pair of a lead vehicle and follower vehicle. The lateral data 40 and the longitudinal data 42 are used to maintain the target offset between a pair of vehicles (e.g., leader-follower vehicle pair) during unloading.

The first wireless communications device 14 and the second wireless communications device 50 supports the communication of one or more of the following: motion data, position data, location data, speed data, velocity data, acceleration data, and heading data between the lead vehicle and the follower vehicle to maintain the target offset between the lead vehicle and the follower vehicle.

The vehicle controller 28 of the lead vehicle system 13 supports control of the navigation of the lead vehicle and the maintenance of the target offset. The vehicle controller 28 of the lead vehicle may control the propulsion system 34, the steering system 30 and the braking system 32 to steer, accelerate, or decelerate the lead vehicle, for example. In the follower vehicle, the second user interface 56 may provide the operator with a display (e.g., light bar) such that the operator can steer or guide the vehicle consistent with the target offset.

In one embodiment, the first wireless communications device 14 transmits a command data message between the first wireless communications device 14 at the lead vehicle and the second wireless communications device 50 at the follower vehicle. The second data processor 52 is adapted to (or programmed with software instructions to) display the command data message received from the lead vehicle such that an operator of the follower vehicle can track manually the path of the lead vehicle by the operator's operation of the steering wheel of the follower vehicle.

Figure 2:
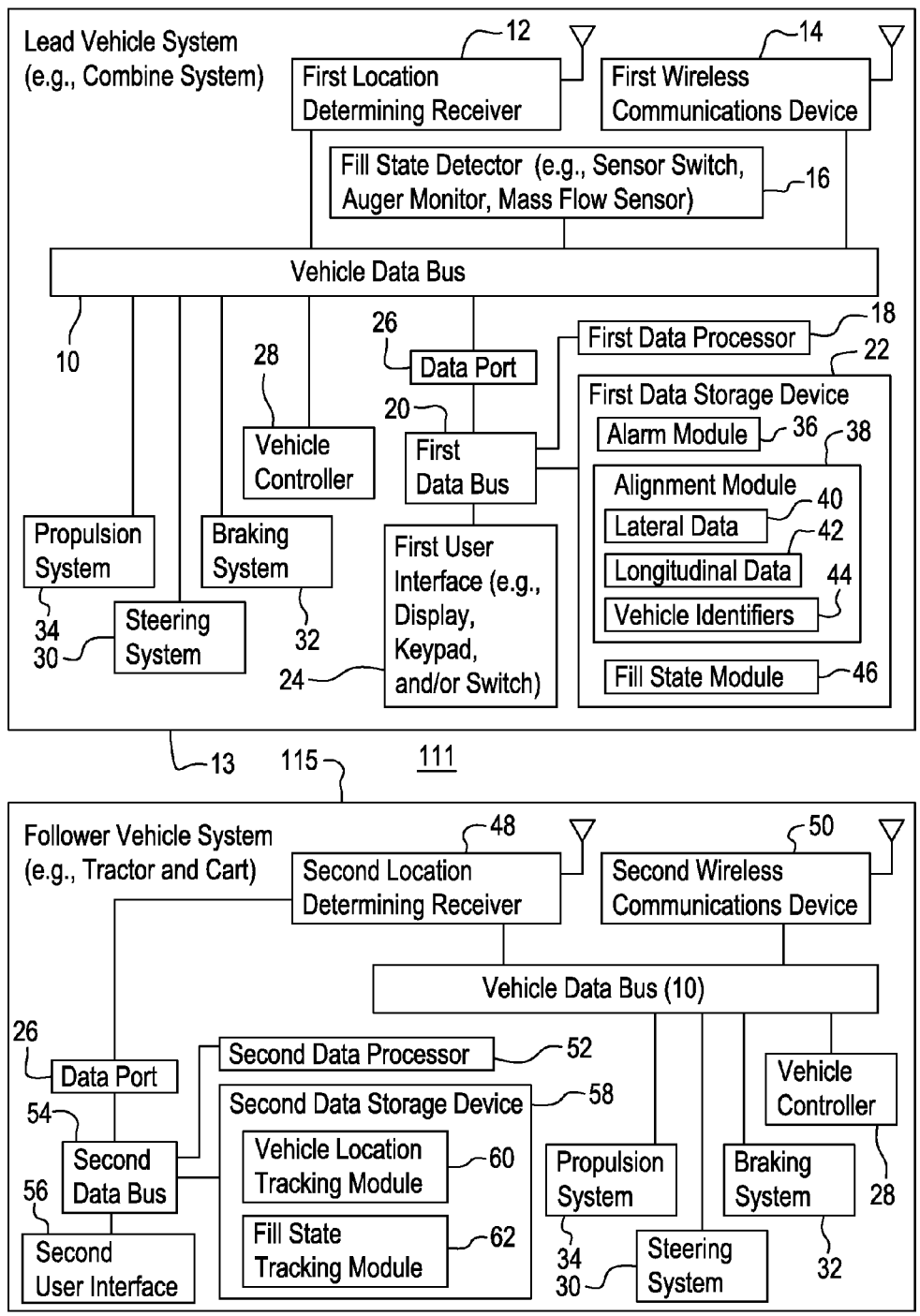
FIG. 2 is a block diagram of another embodiment of a system for transferring material between two vehicles.

The system 111 of FIG. 2 is similar to the system 11 of FIG. 1, except the follower vehicle system 115 of the system 111 of FIG. 2 further comprises a propulsion system 34, a steering system 30, a braking system 32 and a vehicle controller 28. Like reference numbers in FIG. 1 and FIG. 2 indicate like elements. The vehicle controller 28 is capable of automatically steering the follower vehicle in an unmanned mode, or an automated steering mode where the operator supervises the automatic steering and propulsion of the vehicle, for example.

Accordingly, in response to the second wireless communications device 50 receiving a data message from the first wireless communications device 14 that the lead vehicle fill status is greater than a threshold level or an unloading request, the vehicle controller 28 (e.g., of the follower vehicle) controls the follower vehicle via a propulsion system 34, the steering system 30, and the braking system 32 to approach a vehicle location of the lead vehicle that has the fill status at or above the threshold level.

In one embodiment, while the leader vehicle and the follower vehicle are coupled for coordinated movement for unloading material, the first wireless communications device 14 transmits a command data message between the first wireless communications device 14 at the lead vehicle and the second wireless communications device 50 at the follower vehicle. The second data processor 52 is adapted to (or programmed with software instructions to) process the command data message by a vehicle controller 28 (of the follower vehicle) and steering system 30 where the follower vehicle automatically tracks a path of the lead vehicle consistent with the command data message received at the follower vehicle. The command data may be generated by the first data processor 18 or the alignment module 38.

Figure 3:
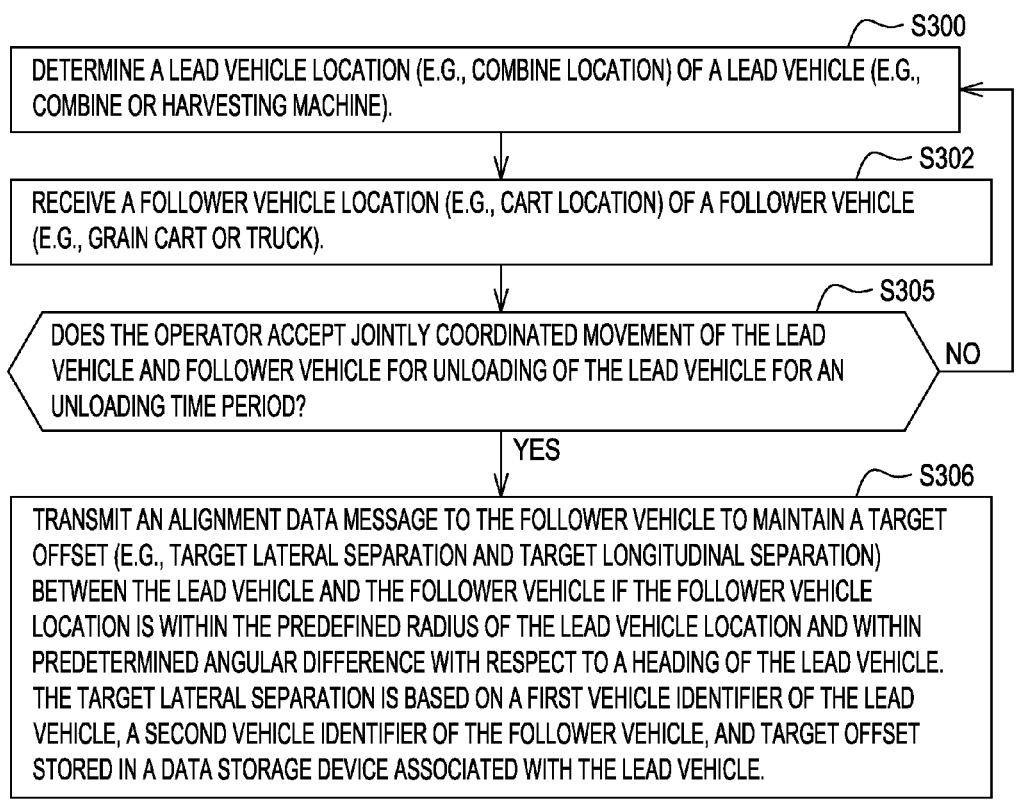
FIG. 3 is flow chart of one embodiment of a method for transferring material (e.g., agricultural material) between two vehicles.

FIG. 3 is flow chart of one embodiment of a method for transferring agricultural material between two vehicles. The method of FIG. 3 begins in step S300.

In step S300, the first location-determining receiver 12 determines a lead vehicle location (e.g., a combine location) of a lead vehicle (e.g., combine or harvesting machine).

In step S302, a first wireless communication device 14 receives a follower vehicle location (e.g., cart location) of a follower vehicle (e.g., grain cart or truck). For example, the second location-determining receiver 48 determines a follower vehicle location and the second wireless communications device 50 transmits the follower vehicle location data to the first wireless communications device 14, which receives the follower vehicle location data.

In step S305, the first data processor 18 or the alignment module 38 determines whether or not the operator accepts or activates jointly coordinated movement (e.g., virtual coupling, as opposed to physical coupling) of the lead vehicle and the follower vehicle for unloading material from the lead vehicle for an unloading period. If the operator accepts or activates the jointly coordinated movement via the user interface 24 of the lead vehicle system 13, the method continues with step S306. However, if the operator rejects (or does not accept or does not activate) the jointly coordinated movement via the first user interface 24, the method returns to step S300, where the lead vehicle may be approached by another (e.g., the next) follower vehicle within the fleet or the original follower vehicle.

In step S306, the first wireless communications device 14 transmits an alignment data message to the second wireless communications device 50 of follower vehicle to maintain a target offset (e.g., target lateral separation and target longitudinal separation) between the lead vehicle and the follower vehicle if the follower vehicle location is within: (1) a proximity zone of the lead vehicle, or (2) the predefined radius of the lead vehicle location and within the predetermined angular difference with respect to a heading of the lead vehicle. In one embodiment, a target offset is defined by a target lateral separation and target longitudinal separation between the lead vehicle and the follower vehicle. The target lateral separation is based on a first vehicle identifier 44 of the lead vehicle, a second vehicle identifier 44 of the follower vehicle, and target offset stored in the first data storage device 22 associated with the lead vehicle.

Figure 4:
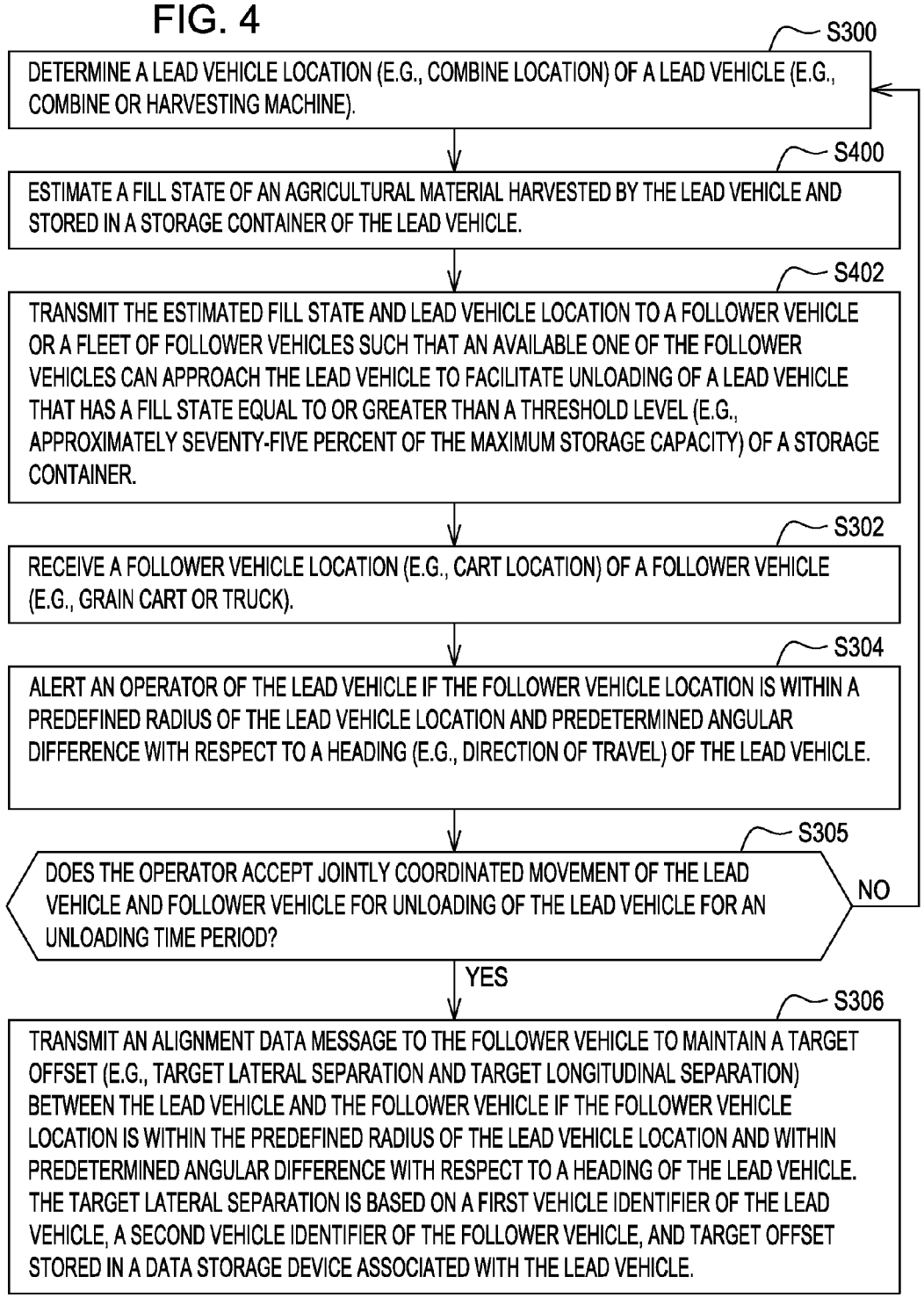
FIG. 4 is flow chart of another embodiment of a method for transferring material between two vehicles.

The method of FIG. 4 is similar to the method of FIG. 3, except the method of FIG. 4 further comprises additional steps S400, S402 and S304. Like reference numbers indicate like steps in FIG. 3 and FIG. 4.

In step S300, the first location-determining receiver 12 determines a lead vehicle location (e.g., a combine location) of a lead vehicle (e.g., combine or harvesting machine).

Step S400 may be executed prior to, during, or after step S300.

In step S400, a fill state detector 16 estimates a fill state of a material (e.g., an agricultural material) held or harvested by the lead vehicle and stored in a storage container of the lead vehicle.

In step S402 after step S400, the first wireless communications device 14 may transmit the estimated fill state and lead vehicle location to a second wireless communications device 50 of a follower vehicle or fleet of follower vehicles such that an available one of the follower vehicles can approach the lead vehicle to facilitate unloading of a lead vehicle that has a fill state equal to or greater than a threshold level (e.g., approximately seventy-five percent of the maximum storage capacity) of a storage container (e.g., a grain cart) associated with the lead vehicle (e.g., combine).

In step S302, a first wireless communications device 14 receives a follower vehicle location (e.g., cart location) of a follower vehicle (e.g., grain cart or truck). For example, the second location-determining receiver 48 determines a follower vehicle location and the second wireless communications device 50 transmits the follower vehicle location data to the first wireless communications device 14, which receives the follower vehicle location data.

In step S304, a first user interface 24 or first data processor 18 of the lead vehicle system 13 alerts an operator of the lead vehicle if the follower vehicle location is within a proximity zone of the lead vehicle, if the follower vehicle is within a predefined radius (e.g., 602 in FIG. 6) of the lead vehicle location and predetermined angular difference with respect to a heading (e.g., direction of travel) of the lead vehicle. Although other predefined radii fall within the scope of the claims, in one example the predefined radius (e.g., 602) is approximately 50 (fifty) meters or 170 (one-hundred and seventy) feet. Although other predetermined angular differences (e.g., 604, 606 in FIG. 6) fall within the scope of the claims, in one example the predetermined angular difference (e.g., 604, 606) is within an angular range of approximately 80 (eighty) degrees (e.g., plus or minus 80 degrees) from the heading of the lead vehicle. In one configuration, the proximity zone (e.g., 603 in FIG. 6) between the lead vehicle and the follower vehicle is defined by the predefined radius and the predetermined angular difference. For example, the follower vehicle lies within the proximity zone (e.g., 603) if the predetermined angular difference is within an arc or range of approximately 200 (two hundred) degrees from approximately 80 degrees to approximately 280 (two hundred and eighty) degrees toward the back and sides of the lead vehicle. In one embodiment, the first user interface 24 alerts the operator of the lead vehicle to the proximity of the follower vehicle (e.g., in the proximity zone) by an audible tone. In an alternate embodiment, the user interface 24 is configured to alert the operator to the proximity of the follower vehicle by an audible tone that becomes higher in frequency as the follower vehicle approaches, or lower in frequency as the follower vehicle recedes.

In step S305, the first data processor 18 or an alignment module 38 determines whether or not the operator accepts jointly coordinated movement (e.g., virtual coupling) of the lead vehicle and the follower vehicle for unloading of material from the lead vehicle for an unloading period. If the operator accepts or activates the jointly coordinated movement via the user interface 24 of the lead vehicle system 13, the method continues with step S306. However, if the operator rejects (or does not accept or does not activate) the jointly coordinated movement via the user interface 24, the method returns to step S300, where the lead vehicle may be approached by another (e.g., the next) follower vehicle within the fleet or the original follower vehicle.

In step S306, the first wireless communications device 14 transmits an alignment data message to the second wireless communications device 50 at the follower vehicle to maintain a target offset (e.g., target lateral separation and target longitudinal separation) between the lead vehicle and the follower vehicle if the follower vehicle location is within the proximity zone or within the predefined radius of the lead vehicle location and within the predetermined angular difference with respect to a heading of the lead vehicle. In one configuration, the target offset is based on a first vehicle identifier 44 of the lead vehicle, a second vehicle identifier 44 of the follower vehicle stored in the first data storage device 22 associated with the lead vehicle. In another configuration, the target offset is based on vehicle dimensions, turning radius, wheelbase and other vehicle parameters of each lead vehicle and follower vehicle (e.g., within a fleet).

Figure 5:
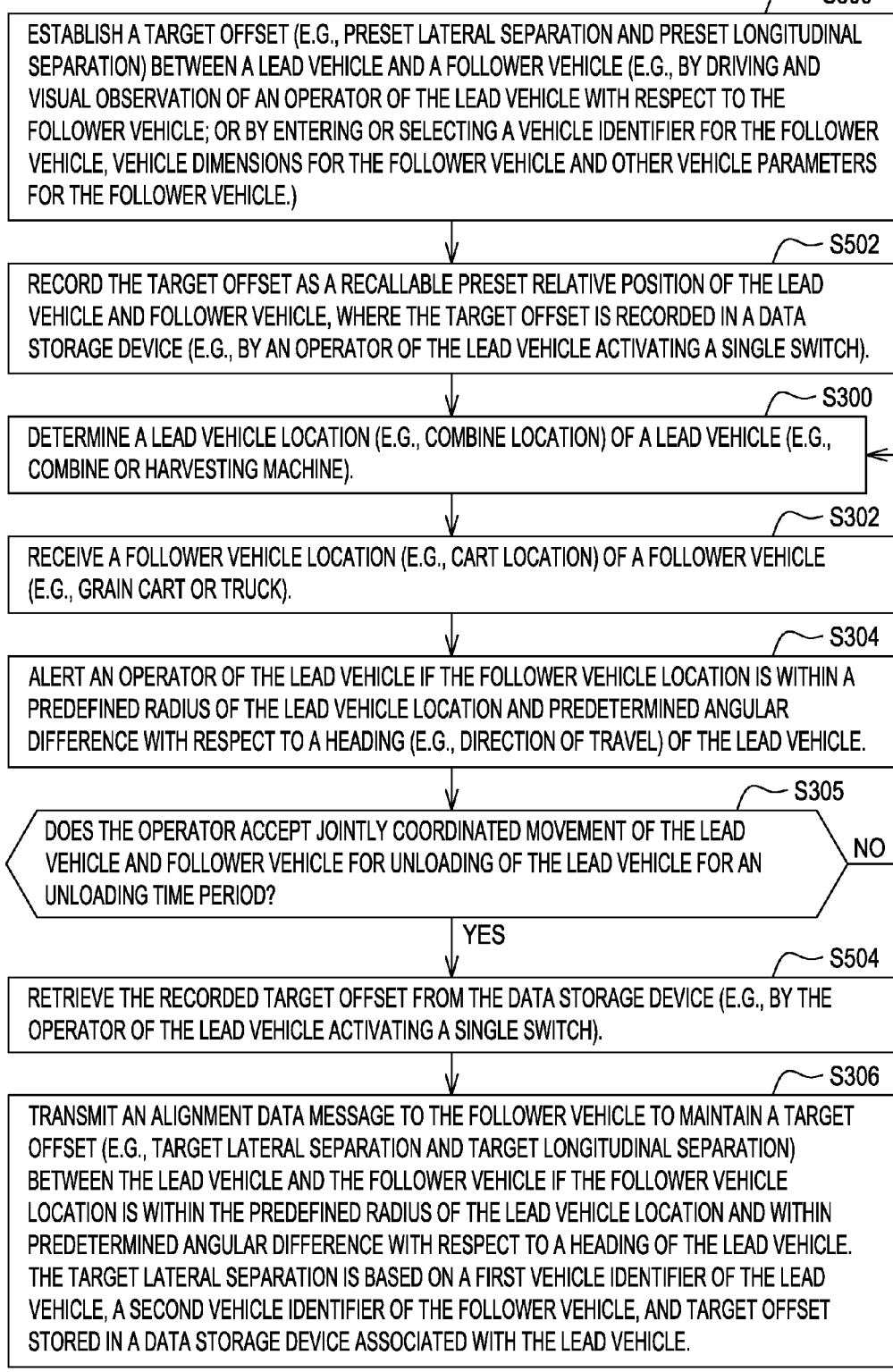
FIG. 5 is flow chart of yet another embodiment of another method for transferring material between two vehicles.

The method of FIG. 5 is similar to the method of FIG. 3, except the method of FIG. 5 comprises additional steps S500, S502, S304, and S504. Like reference numbers in FIG. 3 and FIG. 5 indicate like elements.

In step S500, as instructed by the operator via the first user interface 24 (e.g., a switch), the lead vehicle system 13 or the first data processor 18 establishes a target offset (e.g., a preset lateral separation and preset longitudinal separation) between a lead vehicle and a follower vehicle (e.g., by driving and visual observation of an operator of the lead vehicle with respect to the follower vehicle; or by entering or selecting a vehicle identifier 44 for the follower vehicle, vehicle dimensions, turning radius, and wheelbase for the follower vehicle, and other vehicle parameters for the follower vehicle. The first data processor 18 or alignment module may retrieve stored vehicle dimensions for the lead vehicle, turning radius, wheelbase and other vehicle parameters for the lead vehicle from the first data storage device 22.

In step S502, as instructed by the operator via the first user interface 24 (e.g., a switch), the lead vehicle system 13 or the first data processor 18 records the target offset as a recallable preset relative position of the lead vehicle and follower vehicle, where the target offset is recorded in the first data storage device 22 (e.g., by an operator of the lead vehicle activating a single switch.) The single switch may be a virtual switch displayed on a touch-screen display of the first user interface 24 or a single electro-mechanical device.

In step S300, the first location determining receiver 12 determines a lead vehicle location (e.g., a combine location) of a lead vehicle (e.g., combine or harvesting machine).

In step S302, a first wireless communication device 14 receives a follower vehicle location (e.g., cart location) of a follower vehicle (e.g., grain cart or truck). For example, the second location determining receiver 48 determines a follower vehicle location and the second wireless communication device 50 transmits the follower vehicle location data to the first wireless communications device 14, which receives the follower vehicle location data.

In step S304, a first user interface 24 or first data processor 18 of the lead vehicle system 13 alerts an operator of the lead vehicle if the follower vehicle location is within a predefined radius of the lead vehicle location and predetermined angular difference with respect to a heading (e.g., direction of travel) of the lead vehicle. In one embodiment, the lead vehicle or its first wireless communications device 14 transmits the estimated fill state of the container of the lead vehicle and the lead vehicle location to the follower vehicle or fleet of the follower vehicles such that an available one of the follower vehicles can approach the lead vehicle to facilitate unloading a container of the lead vehicle that has a fill status equal to or greater than a certain threshold (e.g., approximately seventy-five percent of the maximum storage capacity of the storage container).

In step S305, the first data processor 18 or alignment module 38 determines whether or not the operator accepts jointly coordinated movement (e.g., virtual coupling) of the lead vehicle and the follower vehicle for unloading of the lead vehicle for an unloading time period. If the operator accepts or activates the jointly coordinated movement via the user interface 24 of the lead vehicle system 13, the method continues with step S504 and step S306. However, if the operator rejects (or does not accept or does not activate) the jointly coordinated movement via the first user interface 24, the method returns to step S300, where the lead vehicle may be approached by another (e.g., the next) follower vehicle within the fleet or the original follower vehicle.

In step S504, the first data processor 18 or the first data storage device 22 retrieves the recorded target offset from the data storage device (e.g., by the operator of the lead vehicle activating a single switch). Step S504 may be carried out in accordance with various techniques that may be applied alternately or cumulatively.

Under a first technique, the preset target offset comprises a preset lateral separation and a preset longitudinal separation between the vehicles, where the preset target offset is established by visual observation of an operator of the lead vehicle that is moving in alignment with a follower vehicle and where a first vehicle identifier of the follower vehicle and the associated preset target offset are recorded in the first data storage device 22 associated with the lead vehicle.

Under a second technique, the preset target offset comprises a preset lateral separation and a preset longitudinal separation that are established by entering or selecting the dimensions, wheelbase and minimum turning radius of the lead vehicle and the follower vehicle, where the first vehicle identifier and the associated preset target offset are recorded in the first data storage device 22 associated with the lead vehicle.

Under a third technique, the operator of the lead vehicle establishes the preset target offset by the operator of the lead vehicle activating a single switch of the first user interface 24 to record or read the present target offset in the first data storage device 24, where the preset target offset comprises a preset lateral separation and a preset longitudinal separation between a cooperating pair of the lead vehicle and the follower vehicle. By one touch contact with the switch of the first user interface 24, an operator of the lead vehicle may establish or set a preset target offset between the vehicles; the operator may recall readily and quickly the preset target offset during later operation of the lead vehicle via the switch or first user interface 24 by one touch contact with, or command of, the switch, for example.

In step S306, the first wireless communications device 14 transmits an alignment data message to the second wireless communications device 50 of the follower vehicle to maintain a target offset (e.g., target lateral separation and target longitudinal separation) between the lead vehicle and the follower vehicle if the follower vehicle location is within the predefined radius of the lead vehicle location and within the predetermined angular difference with respect to a heading of the lead vehicle. The target lateral separation is based on a first vehicle identifier 44 of the follower vehicle, a second vehicle identifier 44 of the lead vehicle, and target offset stored in the first data storage device 22 associated with the lead vehicle. In one configuration, the lead vehicle may operate in a leader mode while the follower vehicle operates in a follower mode following the lead vehicle in the direction of travel of the lead vehicle and with a follower vehicle heading that tracks a lead vehicle heading (e.g., or a tracking error of the lead vehicle heading).

Figure 6:
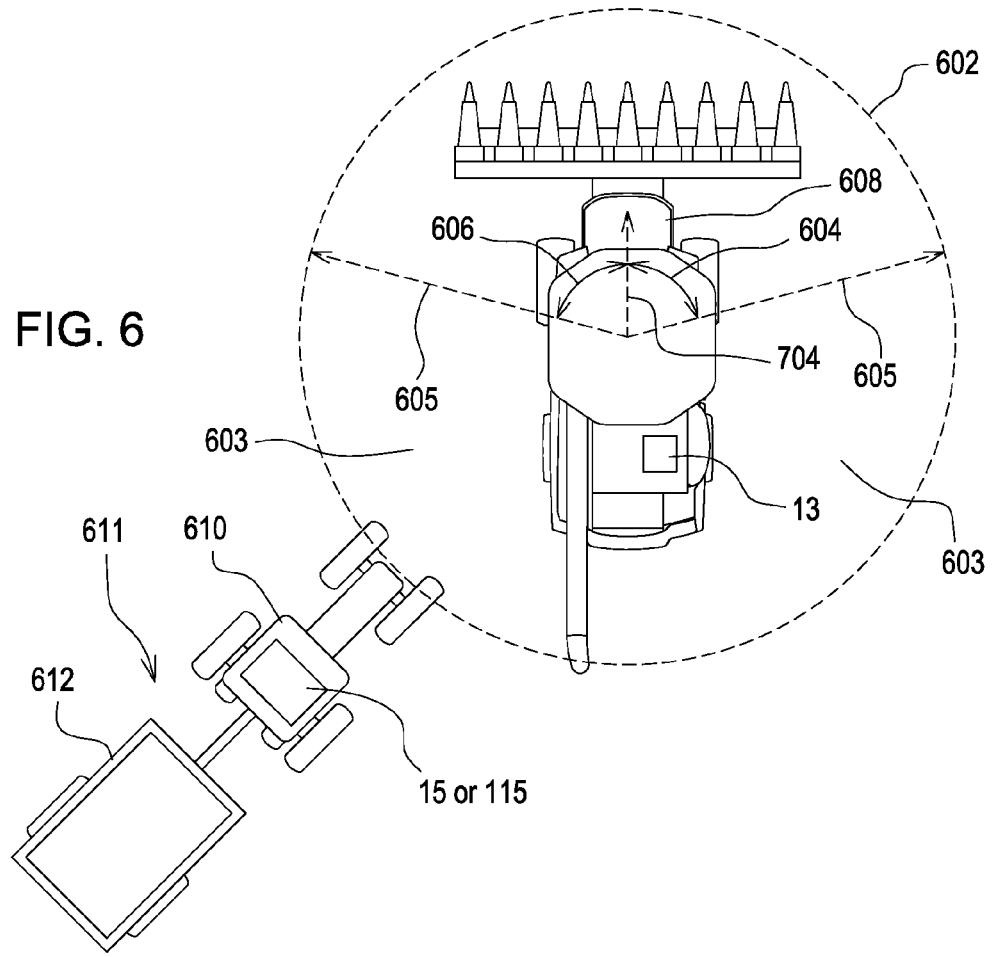
FIG. 6 is a plan view of a follower vehicle (e.g., tractor and grain cart) approaching a lead vehicle (e.g., combine) in accordance with any method and system disclosed herein.

FIG. 6 shows an overhead or plan view of a follower vehicle 611 that approaches a lead vehicle 608 within a predefined radius 602 of the lead vehicle 608 and within a predetermined angular difference (606, 604) with respect to the heading 704 of the lead vehicle 608. In one example, the predetermined angular difference extends over a range or arc from approximately 80 degrees of the lead vehicle heading to approximately 280 degrees of the lead vehicle heading. In another example, the predetermined angular difference defines a proximity zone 603 bounded by linear segments 605 of the angular difference (604,606) and the predefined radius 602, where any available follower vehicle within the proximity zone 603 is eligible to unload material from the lead vehicle 608.

The lead vehicle 608 is equipped with a lead vehicle system 13; the follower vehicle 611 is equipped with a follower vehicle system (15 or 115). As illustrated, the lead vehicle 608 comprises a combine or harvesting machine, and the follower vehicle 611 comprises the combination of a tractor 610 and a grain cart 612, although other vehicle configurations fall within the scope of the appended claims and are not limited by the illustrative vehicle configuration of FIG. 6. As the follower vehicle enters a spatial zone or proximity zone 603 within the predetermined angular distance (604, 606) and within the predefined radius 602 (e.g., behind and to the left side of the lead vehicle) in FIG. 6, the first user interface 24 of the lead vehicle system 13 alerts the operator that the follower vehicle 611 is available for unloading the container of the lead vehicle 608 as a virtual coupled pair of the lead vehicle 608 and the follower vehicle 611. The pair is virtually coupled because there is no actual physical connection between the lead vehicle and the follower vehicle; yet, the follower vehicle tracks the lead vehicle with the target offset or another generally fixed or constant spatial separation.

Figure 7:
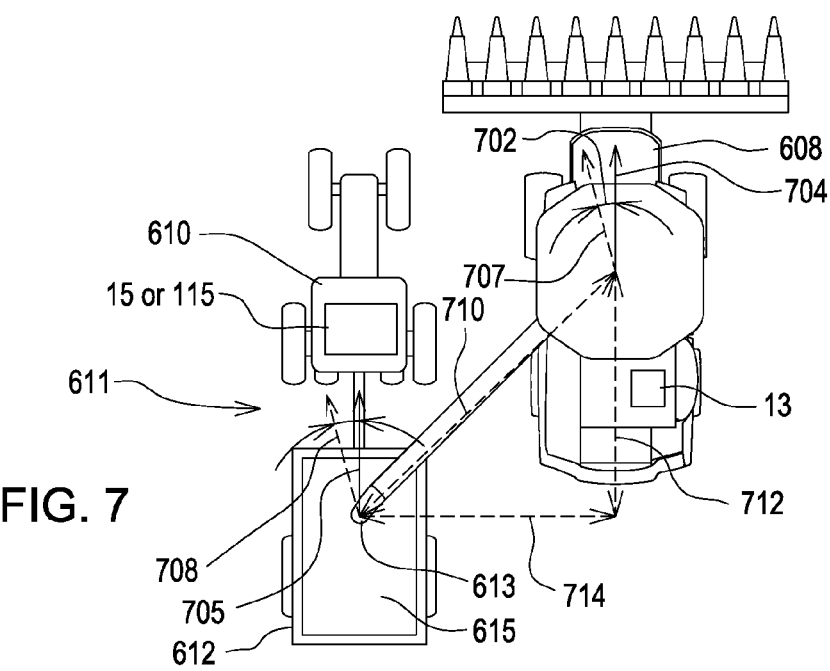
FIG. 7 is a plan view of lead vehicle and a follower vehicle that are aligned for the transferring of agricultural material (e.g., harvested crop) from the lead vehicle to the follower vehicle in accordance with any method and system disclosed herein.

FIG. 7 shows an overhead or plan view of a lead vehicle 608 and a follower vehicle 611 engaged in coordinated movement (e.g., virtual coupling) or maintaining a target offset 710 with respect to each other. For example, FIG. 7 may be illustrative of step S306 in FIG. 3 through FIG. 5, although other FIG. 7 may apply to other steps or procedures within the scope of the appended claims. As illustrated in FIG. 7, the target offset 710 comprises a target lateral separation 714 and a target longitudinal separation 712. The target lateral separation 714 may be measured perpendicularly to the direction of travel or heading 704 of the lead vehicle or the heading of the follower vehicle 705. In one example, the target lateral separation 714 and the target longitudinal separation 712 may be expressed as vectors or Cartesian components of the target offset. As shown, the chute outlet 613 of the combine or lead vehicle 608 is aligned over a region 615 (e.g., central region) of the cart 612 for unloading agricultural material (e.g., grain) into the cart 612, while the lead vehicle 608 and the follower vehicle 611 are both moving such that the lead vehicle 608 can continue harvesting crop, or performing another work task, while simultaneously unloading previously collected material (e.g., previously harvested crop) into the cart. The method and system are well suited for simultaneous unloading of the container 707 (e.g., grain tank) of the lead vehicle while harvesting.

During unloading, the lead vehicle and the follower vehicle move in the direction of travel (704, 705), respectively. The heading 707 of the lead vehicle or a heading error 707 of the lead vehicle may be determined with reference to the direction of travel 704 of the vehicle or with respect to an absolute direction, such as the magnetic North pole of the Earth. The heading 705 of the follower vehicle 611 or a heading error 708 of the follower vehicle 611 may be determined with reference to the direction of travel 705 of the follower vehicle 611 or with respect to an absolute direction, such as the magnetic North pole of the Earth. The lead vehicle system 13 may communicate its heading 704 and its heading error 707 of the lead vehicle 608 to the follower vehicle system (15 or 115) via the first wireless communications device 14 and the second wireless communications device 50. Simultaneously, the follower vehicle system may communicate its heading 705 and its heading error 708 via the first wireless communications device 14 and the second wireless communications device 50.

Accordingly, the system and method disclosed herein promotes efficient operation of a farm or agricultural operation by supporting real-time iterative pairing of respective lead vehicles and different follower vehicles within a fleet to minimize down-time of lead vehicles that otherwise might be waiting for one or more follower vehicles to unload material from a respective lead vehicle. Accordingly, the lead vehicle or lead vehicles within a fleet can continue harvesting material, or doing other tasks, without stopping and waiting for the assignment of a follower vehicle to facilitate the transfer or unloading of material from the lead vehicle. Further, the system and method disclosed herein is well suited for facilitating virtual coupling between vehicles, or coordinated movement consistent with a target offset or constant spatial separation between a pair of a lead vehicle and follower vehicle to support transferring or unloading of material from the lead vehicle to the follower vehicle. An operator of the lead vehicle may establish or set a preset target offset between the vehicles via a switch or user interface, and the operator may recall readily the preset target offset during later operation of the lead vehicle via the switch or user interface by a one touch contact with, or command of, the switch, for example. Although the lead vehicle may comprise a combine or a harvesting machine that stores harvested agricultural material in a container (e.g., grain tank), in alternate embodiments the lead vehicle may comprise any heavy equipment for mining, earth-moving, construction, or forestry. Similarly, although the follower vehicle may comprise a grain cart, in alternate embodiments the follower vehicle may comprise a truck or other heavy equipment.

Having described the preferred embodiment, it will become apparent that various modifications can be made without departing from the scope of the invention as defined in the accompanying claims.

The following is claimed:

1. A method for managing the unloading or transferring of agricultural material between a plurality of vehicles, the method comprising:
   determining a lead vehicle location of a lead vehicle;
   receiving a follower vehicle location of a follower vehicle;
   alerting an operator of the lead vehicle if the follower vehicle location is within a predefined radius of the lead vehicle location and a predetermined angular difference with respect to a heading of the lead vehicle;
   providing an operator of the lead vehicle with a user interface response mechanism in response to a received data message request from the follower vehicle within the predefined radius and predetermined angular distance such that the operator can accept or reject jointly coordinated movement of the lead vehicle and follower vehicle for unloading the lead vehicle during an unloading period; and
   transmitting an alignment data message to the follower vehicle to maintain a target offset between the lead vehicle and the follower vehicle if the operator accepts the jointly coordinated movement, the target offset based on a first vehicle identifier of the follower vehicle, a second vehicle identifier of the lead vehicle, and preset target offset stored in at data storage device associated with the lead vehicle,
   estimating a fill state of an agricultural material harvested by the lead vehicle and stored in a storage container of the lead vehicle; and
   transmitting the estimated fill state and the lead vehicle location to the follower vehicle or a fleet of follower vehicles such that an available one of the follower vehicles can approach the lead vehicle to facilitate unloading of a lead vehicle that has a fill status equal to or greater than approximately seventy-five percent of the maximum storage capacity of storage container.

2. The method according to claim 1 wherein the target offset comprises a target lateral separation and a target longitudinal separation between the lead vehicle and the follower vehicle.

3. The method according to claim 1 wherein the lead vehicle comprises a harvesting vehicle for harvesting the agricultural material and wherein the follower vehicle comprises a cart or mobile device for storing the agricultural material.

4. The method according to claim 1 wherein the predefined radius is approximately 50 meters or less and where the predetermined angular difference is approximately 80 degrees or less.

5. The method according to claim 1 wherein the preset target offset comprises a preset lateral separation and the preset heading that are established by visual observation of an operator of the lead vehicle with respect to the follower vehicle; where first vehicle identifier, the associated preset target offset are recorded in the data storage device associated with the lead vehicle.

6. The method according to claim 1 wherein the preset target offset comprises a preset lateral separation and the preset heading are established by entering or selecting the dimensions, wheelbase and minimum turning radius of the lead vehicle and the follower vehicle; where first vehicle identifier, the associated preset target offset are recorded in the data storage device associated with the lead vehicle.

7. The method according to claim 1 further comprising establishing the preset target offset by the operator of the lead vehicle activating a single switch to record or read preset target offset comprising a preset lateral separation and a preset longitudinal separation between a cooperating pair of the lead vehicle and the follower vehicle.

8. The method according to claim 1 wherein the lead vehicle operates in a leader mode and wherein the follower vehicle operates in a follower mode following the lead vehicle in the direction of travel of the lead vehicle and with a follower vehicle heading that tracks a lead vehicle heading.

9. The method according to claim 8 further comprising:
transmitting a command data message between wireless communication devices at the lead vehicle and the follower vehicle, and
processing the command data message by a vehicle controller and steering system where the follower vehicle automatically tracks a path of the lead vehicle consistent with the command data message received at the follower vehicle.

10. The method according to claim 8 further comprising:
transmitting a command data message between wireless communications devices at the lead vehicle and the follower vehicle, and
displaying the command data message received from the lead vehicle such that an operator of the follower vehicle can track manually the path of the lead vehicle by the operator's operation of the steering wheel of the follower vehicle.

11. The method according to claim 1 wherein first vehicle identifier is associated with vehicle dimensions, wheelbase, and turning radius parameters of the follower vehicle and wherein the second vehicle identifier is associated with vehicle dimensions, wheelbase and turning radius parameters of the lead vehicle.

12. A system for managing the unloading of a lead vehicle, the method comprising:
a first location-determining receiver for determining a lead vehicle location of a lead vehicle;
a second location-determining receiver for determining a follower vehicle location of a follower vehicle;
a wireless device for transmitting the lead vehicle location to the follower vehicle;
an alarm module for alerting an operator of the lead vehicle if the follower vehicle location is within a predefined radius and predetermined angle of the lead vehicle location;
a data processor for aligning a target offset between the lead vehicle and the follower vehicle if the operator accepts the jointly coordinated movement, the target offset and heading based on a first vehicle identifier of the follower vehicle, a second vehicle identifier of the lead vehicle, and target offset stored in a data storage device associated with the lead vehicle;
a fill state detector for estimating a fill state of an agricultural material harvested by the lead vehicle and stored in a storage container associated with the lead vehicle; and
a wireless device for transmitting the estimated fill state and lead vehicle location to the follower vehicle or a fleet of follower vehicles such that an available one of the follower vehicles can approach the lead vehicle to facilitate unloading of the lead vehicle that has a fill status equal to or greater than approximately seventy-five percent of the maximum storage capacity of storage container.

13. The system according to claim 12 wherein the target offset comprises a target lateral separation and a target longitudinal separation between the lead vehicle and the follower vehicle.

14. The system according to claim 12 wherein the lead vehicle comprises a harvesting vehicle for harvesting the agricultural material and wherein the follower vehicle comprises a cart or mobile device for storing the agricultural material.

15. The system according to claim 12 wherein the wireless device is configured to transmit commands from the lead vehicle to the follower vehicle such that the follower vehicle automatically tracks the path of the lead vehicle.

16. The system according to claim 12 wherein the wireless device is configured to transmit commands from the lead vehicle to a second wireless device on the follower vehicle such that an operator of the follower vehicle receives commands to track manually the path of the lead vehicle by the operator's operation of the steering wheel of the follower vehicle.

17. The system according to claim 12 wherein the preset target offset comprises a preset lateral separation and a preset heading that are established by visual observation of an operator of the lead vehicle with respect to the follower vehicle; where first vehicle identifier, the associated preset lateral separation, and the associated preset heading are recorded in the data storage device associated with the lead vehicle.

18. The system according to claim 12 wherein the preset target offset comprises a preset lateral separation and a preset heading that are established by entering or selecting the dimensions, wheelbase, and minimum turning radius of the lead vehicle with respect to the follower vehicle; where first vehicle identifier, the associated preset lateral separation, and the associated preset heading are recorded in the data storage device associated with the lead vehicle.

19. The system according to claim 12 further comprising:
a single switch in communication with the data processor; the single switch activated to record or read the preset lateral separation and the preset heading.

20. The system according to claim 12 wherein first vehicle identifier is associated with vehicle dimensions, wheelbase, and turning radius parameters of the follower vehicle and wherein the second vehicle identifier is associated with vehicle dimensions, wheelbase and turning radius parameters of the lead vehicle.

21. The system according to claim 12 wherein the predefined radius is approximately 50 meters or less and where the predetermined angular difference is approximately 80 degrees or less.

22. A method for managing the unloading or transferring of agricultural material between a plurality of vehicles, the method comprising:
determining a lead vehicle location of a lead vehicle;
receiving a follower vehicle location of a follower vehicle;
alerting an operator of the lead vehicle of an availability of the follower vehicle in a proximity zone for an unloading assignment or pairing with the lead vehicle to unload the lead vehicle if the follower vehicle location is within a predefined radius of the lead vehicle location and a predetermined angular difference with respect to a heading of the lead vehicle, where the proximity zone and the predefined radius are distinct from a target offset between the vehicles during an unloading period;

providing an operator of the lead vehicle with a user interface response mechanism in response to a received data message request from the follower vehicle within the predefined radius and predetermined angular distance such that the operator can accept or reject jointly coordinated movement of the lead vehicle and follower vehicle for unloading the lead vehicle during the unloading period; and transmitting an alignment data message to the follower vehicle to maintain the target offset between the lead vehicle and the follower vehicle if the operator accepts the jointly coordinated movement, the target offset based on a first vehicle identifier of the follower vehicle, a second vehicle identifier of the lead vehicle, and preset target offset stored in at data storage device associated with the lead vehicle.

23. The system according to claim 22 wherein the predefined radius is approximately 50 meters or less and where the predetermined angular difference is approximately 80 degrees or less.

24. The method according to claim 22 wherein the target offset comprises a target lateral separation and a target longitudinal separation between the lead vehicle and the follower vehicle.

* * * * *